US011724695B2

(12) United States Patent
Lidander et al.

(10) Patent No.: US 11,724,695 B2
(45) Date of Patent: Aug. 15, 2023

(54) METHOD OF PROVIDING A SCENARIO-BASED OVERLAY TORQUE REQUEST SIGNAL IN A ROAD VEHICLE STEER TORQUE MANAGER

(71) Applicants: Zenuity AB, Gothenburg (SE); Volvo Car Corporation, Gothenburg (SE)

(72) Inventors: Niklas Lidander, Mölndal (SE); Lars Johannesson Mårdh, Torslanda (SE); Andreas Carlsson, Västra Frölunda (SE); Markus Löfgren, Onsala (SE); Andreas Lindberg, Gothenburg (SE)

(73) Assignees: Zenuity AB, Gothenburg (SE); Volvo Car Corporation, Gothenburg (SE)

( * ) Notice: Subject to any disclaimer, the term of this patent is extended or adjusted under 35 U.S.C. 154(b) by 325 days.

(21) Appl. No.: 16/800,160

(22) Filed: Feb. 25, 2020

(65) Prior Publication Data
US 2020/0269838 A1 Aug. 27, 2020

(30) Foreign Application Priority Data
Feb. 26, 2019 (EP) ..................................... 19159381

(51) Int. Cl.
*B60W 30/12* (2020.01)
*B60W 60/00* (2020.01)
(Continued)

(52) U.S. Cl.
CPC ........ *B60W 30/12* (2013.01); *B60W 30/0956* (2013.01); *B60W 60/0011* (2020.02);
(Continued)

(58) Field of Classification Search
CPC ........... B60W 60/005; B60W 60/0053; B60W 60/0057; B60W 30/12; B60W 60/0011;
(Continued)

(56) References Cited

U.S. PATENT DOCUMENTS 10,836,431 B1 * 11/2020 Jeon ......................... B62D 6/08
11,203,380 B2 * 12/2021 Suzuki ................... B62D 5/046
(Continued)

*Primary Examiner* — Jeff A Burke
*Assistant Examiner* — Joshua Alexander Garza
(74) *Attorney, Agent, or Firm* — Duane Morris LLP; Gregory M. Lefkowitz; Randall C. Pyles

(57) ABSTRACT

Disclosed is a method of providing a scenario-based overlay torque request signal in a steer torque manager (1) during driver-override of an auxiliary steering assistance system (2) function in a road vehicle (3) having an EPAS system (4). The steer torque manager (1) has a wheel angle controller (1*b*) for providing an assistance torque request related signal, and a driver-in-the-loop functionality (1*a*) for determining driver-override and providing a driver-override related signal. The method comprises receiving signals related to: assistance torque request; driver-override; road vehicle velocity; steering pinion angle; distance to an adjacent lane marker (5*a*, 5*b*); and distance to an adjacent potential threat object (6), and producing, from the received signals, during ongoing driver-override, a signal representative of a resistance torque request corresponding to one of a finite number of pre-defined scenarios for different signal combinations, and producing the scenario-based steering wheel overlay torque request signal through combining the assistance torque request and the resistance torque request signals.

9 Claims, 5 Drawing Sheets

(51) Int. Cl.
  *B60W 30/095* (2012.01)
  *B62D 5/04* (2006.01)
  *G08G 1/16* (2006.01)
  *B60W 30/14* (2006.01)
  *B62D 15/02* (2006.01)

(52) U.S. Cl.
  CPC ........... *B62D 5/0463* (2013.01); *G08G 1/167* (2013.01); *B60W 30/14* (2013.01); *B60W 2554/20* (2020.02); *B60W 2554/40* (2020.02); *B62D 15/026* (2013.01)

(58) Field of Classification Search
  CPC ......... B60W 30/0956; B60W 2554/20; B60W 2554/40; B60W 30/14; B62D 5/0463; B62D 15/026; G08G 1/167
  See application file for complete search history.

(56) References Cited

U.S. PATENT DOCUMENTS

| | | | |
|---|---|---|---|
| 2011/0118936 A1 | 5/2011 | Hong | |
| 2012/0166032 A1* | 6/2012 | Lee | B62D 1/286 |
| | | | 701/23 |
| 2013/0060413 A1* | 3/2013 | Lee | B62D 6/00 |
| | | | 701/23 |
| 2013/0274985 A1 | 10/2013 | Lee et al. | |
| 2016/0121925 A1 | 5/2016 | Lazic et al. | |
| 2016/0152267 A1* | 6/2016 | Morimoto | B62D 15/027 |
| | | | 701/41 |
| 2018/0029640 A1* | 2/2018 | Otto | G05D 1/021 |
| 2018/0354555 A1 | 12/2018 | Sheng et al. | |
| 2019/0080611 A1* | 3/2019 | Yamada | G08G 1/166 |
| 2022/0126851 A1* | 4/2022 | Lu | B60W 50/16 |

\* cited by examiner

METHOD OF PROVIDING A SCENARIO-BASED OVERLAY TORQUE REQUEST SIGNAL IN A ROAD VEHICLE STEER TORQUE MANAGER

TECHNICAL FIELD

The present disclosure relates generally to a method of providing a scenario-based overlay torque request signal in a steer torque manager during driver-override of an auxiliary steering assistance system function in a road vehicle having an electrical power assisted steering system. It also relates to a road vehicle steer torque manager having means adopted to execute the method as well as a computer program comprising instructions to cause the road vehicle steer torque manager to execute the method.

BACKGROUND

The use of power steering in road vehicles is well known, e.g. the use of electrical power assisted steering (EPAS). Such electrical power assisted steering includes electric motors that assists a driver of a road vehicle by adding an assistive torque to e.g. a steering column or steering rack of the road vehicle. EPAS systems are used in road vehicles such as a cars, lorries, buses and trucks.

It is further known to use auxiliary steering assistance system, such as advanced driver assistance systems (ADAS), to help a driver of a road vehicle in the driving process. Such ADAS systems include autonomous steering systems, e.g. lane centering systems. There are also so-called Pilot Assist systems. Pilot Assist systems usually rely on a combination of camera and radar sensors to combine lane centering systems such as lane keeping aid (LKA), also called lane departure avoidance (LDA), with an adaptive cruise-control (ACC) functionality, to help a driver to drive a road vehicle between lane side markers combined with keeping a preset distance to a preceding vehicle.

Pilot Assist systems are thus provided to help a driver of a road vehicle maintain the road vehicle in a desired lane whilst keeping a safe preset distance to a preceding vehicle. For lane keeping aid or lane centering systems where an EPAS is used, a steering wheel torque overlay, i.e. additional steering wheel torque on top of what would have been obtained by a base assist of the EPAS, is used for lateral position control.

ADAS functions, such as Safety Lane keeping aid (sLKA) and Pilot Assist lane keeping aid, control a vehicle by requesting an overlay torque which is added to the normal Electric Power Steering Assistance torque. Safety Lane Keeping aid only intervenes if the vehicle is about the cross the lanes whereas Pilot Assist lane keeping aid centers the vehicle in the lane and can be active as long as the road is visible by a vehicle borne camera/radar system.

If lanes are clearly marked, the road is not to curved and light conditions are good, a Pilot Assist lane keeping aid function is able to control the vehicle in the center of the lane. Since Adaptive Cruise Control also is part of Pilot Assist, a driver will get the sensation that the vehicle is autonomously driven.

However, Pilot Assist is an SAE level 2 function, which means that a driver of a road vehicle equipped therewith must always be ready to take over control. Driver readiness to take over control may e.g. be checked by monitoring contact between the driver's hands and a steering wheel of the road vehicle.

Moreover, the lane keeping aid function should be easy and comfortable to override by a driver. When overriding the lane keeping aid function shall not turn off as, e.g. a driver might in certain situations desire to place the road vehicle with a lateral offset towards the center of the lane.

In order to address this the lane keeping aid function sometimes include a Driver in the Loop (DIL) functionality that detects when the driver wants to override the lane keeping aid function and when the driver wants to hand back control to the lane keeping aid function. During the override, the DIL functionality limits the envelope for the overlay torque that can be requested by a wheel angle controller.

The DIL functionality considers both a current steering wheel torque and a weighted average of a measured steering wheel torque over the last couple of seconds to determine if the driver desires to override the lane keeping aid function. The weighted steering wheel torque average over a time window of the last couple of seconds is called a DIL impulse.

An incomplete list of the design objectives for DIL is as follows. It should be comfortable for the driver to override a lane centering function, i.e. low torque in the steering wheel should be required. A vehicle under lane centering control should be able enter and exit curves on highways with the driver's hands resting on the steering wheel. During an override of a lane centering function the driver should be able to feel the intentions of the lane centering function and most importantly if the lane centering function is on or off, this as the lane centering function might turn off if a vehicle borne camera no longer can see the lane markers. During an override of the lane centering function the driver should not feel high or pulsating torque in the steering wheel. The lane centering function should not cause the vehicle to drift in the lane due to mode confusion between the DIL functionality and the driver regarding who is currently in control of the vehicle.

Since relatively high steering wheel torque levels are needed in order to move a driver's hands in a curve entry or exit situation, the requirement that it should be comfortable for the driver to override a lane centering function and the requirement that a vehicle under lane centering control should be able to enter and exit curves on highways with the driver's hands resting on the steering wheel are partly contradictory, at least if one only considers the amplitude of the steering wheel torque. This contradiction is sometimes addressed by adding a driver activity filter to the DIL impulse calculation.

As long as the DIL impulse is lower than a certain value the driver activity filter is a high pass filter, but when the DIL impulse reaches a certain value the high pass filter start to tend towards weighting all frequencies equally. The current steering wheel torque is also fed through the driver activity filter and the DIL functions hands over control to the driver if the filtered steering wheel torque is higher than a certain value. Once control has been handed over to the driver, the driver activity filter will be turned off until the DIL impulse reaches a low value and stays low for several seconds.

The driver activity filter may be tuned so that the filter suppresses the steering wheel torque increase that occurs when the lane centering function enters and exits curves on a highway. Such tuning may be done to handle the weight of the arms and shoulders of a driver resting his shoulders with two hands on the steering wheel. Curve entries on highways results in relatively slow torque transient so the driver activity filter can be tuned so that it is easy for the driver to take over control by simply applying torque somewhat faster than a cut in frequency of the driver activity filter.

The DIL functionality may be arranged to distinguish between resistance torque and assistance torque. Resistance torque pulls against the driver and assistance torque pulls in the same direction as the driver. To be more specific, resistance torque is the maximum overlay torque that a wheel angle controller can request in the opposite direction towards a measured steering wheel torque.

It is known to tune a steering torque manager to prioritize the objective that the driver should not feel high or pulsating torque in the steering wheel during an override of the lane centering function. This whilst performing "good enough" on the objectives that the driver should be able to feel the intentions of the lane centering function during an override. Furthermore, the lane centering function should not cause the vehicle to drift in the lane due to mode confusion between the DIL functionality and the driver regarding who is currently in control of the vehicle. However, with such prioritization, during a driver-override of the lane centering function, the resistance torque will be approximately two times the total friction in the EPAS and steering system, which means that the driver will just barely be able to feel that the function is active.

A problem with prioritizing the design objective that the driver should not feel high or pulsating torque in the steering wheel during an override of the lane centering function in the DIL functionality, is that with low levels of resistance torque the steering wheel torque will often be so low that it is difficult to determine when the driver desires to hand back control to the lane centering function.

Another problem is that with low levels of resistance torque the driver, when overriding the lane centering function, might not feel how the vehicle is positioned relative to the lane centering path. An unaware driver might unintentionally override the lane centering function and drift out of lane towards a threat. The first notice will be when the collision avoidance function Emergency Lane Keeping Aid (eLKA) is activated.

SUMMARY

An object of the present invention is to provide an improved method of providing a scenario-based overlay torque request signal in a steer torque manager during driver-override of an auxiliary steering assistance system function in a road vehicle.

The invention is defined by the appended independent claims. Embodiments are set forth in the appended dependent claims and in the figures.

According to a first aspect there is provided a method of providing a scenario-based overlay torque request signal in a steer torque manager during driver-override of an auxiliary steering assistance system function in a road vehicle having an electrical power assisted steering system, the steer torque manager having: a wheel angle controller for providing an assistance torque request related signal from an auxiliary steering assistance system function overlay torque request and a torque request from the electrical power assisted steering; a driver-in-the-loop functionality for determining driver-override of the auxiliary steering assistance system function through considering both a current steering wheel torque and a weighted average of a measured steering wheel torque over the last couple of seconds and providing a driver-override related signal, the method comprising: receiving the assistance torque request related signal; receiving the driver-override related signal; receiving a road vehicle velocity related signal; receiving a steering pinion angle related signal; receiving a signal representative of a distance to an adjacent lane marker; receiving a signal representative of a distance to an adjacent potential threat object; producing from the received signals, when the driver-override related signal indicates ongoing driver-override, a signal representative of a resistance torque request corresponding to one of a finite number of pre-defined scenarios for different signal combinations; producing, by the steer torque manager, the scenario-based steering wheel overlay torque request signal through combining the assistance torque request signal and the resistance torque request signal.

In a further embodiment the method comprises receiving as the signal representative of a distance to an adjacent potential threat object a signal representative of an estimated Times to Collision (TTC) with an adjacent potential threat object.

In a yet further embodiment producing the signal representative of a resistance torque request further comprises scaling the signal with the functions:

$f(x)_i$: $x \in [-1,1]$, $i \in \Omega$
$g(TTC)_i$: $TTC \in [0, TTC_{max}]$, $i \in \Omega$ where the set $\Omega$ contains a finite number of pre-defined scenarios for which a resistance torque previously has been separately tuned, and x is a normalized distance from an adjacent lane marker to a center of a lane currently traveled; a left-hand lane marker being located at $x=-1$ and a right-hand lane marker being located at $x=1$.

In a still further embodiment the method further comprises receiving a signal representative of classified potential threat objects determined through fusion of sensor data from multiple vehicle born sensors and systems, such as camera sensors, radar sensors, lidar sensors, satellite navigation systems and digital maps, and determining a current scenario from the set $\Omega$ of pre-defined scenarios based on the signal representative of classified potential threat objects.

In an additional embodiment the method further comprises using, for a determined pre-defined scenario with no potential threat objects to the right or to the left of the road vehicle, a function $f(x)$ being a convex bathtub shaped function with a flat minimum at $x=0$ and monotonically increasing with increasing |x| as the road vehicle approaches a lane marker.

In yet an additional embodiment the method further comprises using, for a determined scenario with threat objects either to the left or to the right of a lane currently traveled by the road vehicle, a function $f(x)$ being asymmetric around the center $x=0$ of the lane currently traveled and increasing as the road vehicle approaches threat objects.

In still an additional embodiment the method further comprises using, in case that a driver of the road vehicle is pulling against the auxiliary steering assistance system function towards a collision with a potential threat object, a function $g(TTC)_i$ arranged to increase the resistance torque, the function $g(TTC)_i$ being increasing with decreasing Time to Collision TTC, and if $TTC > TTC_{max}$ then the function $g(TTC)_i = 1$.

Furthermore, here envisaged is a road vehicle steer torque manager having means adopted to execute the above method.

Thus, accordingly there is provided a road vehicle steer torque manager having: a wheel angle controller for providing an assistance torque request related signal from an auxiliary steering assistance system function overlay torque request and a torque request from the electrical power assisted steering; and a driver-in-the-loop functionality for determining driver-override of the auxiliary steering assistance system function through considering both a current steering wheel torque and a weighted average of a measured steering wheel torque over the last couple of seconds and providing a driver-override related signal; the road vehicle steer torque manager having means adopted to execute the method.

Still further here envisaged is a computer program comprising instructions to cause the above road vehicle steer torque manager to execute the above method.

Thus, accordingly there is provided a computer program comprising instructions to cause the above road vehicle steer torque manager to execute the above method.

The above embodiments have the beneficial effects of providing a scenario-based overlay torque request signal in a steer torque manager during driver-override of an auxiliary steering assistance system function, and thus providing for a threat-based steering feel, during driver-override of an auxiliary steering assistance system function, e.g. override of a lane centering ADAS function, in a road vehicle.

BRIEF DESCRIPTION OF DRAWINGS

In the following, embodiments herein will be described in greater detail by way of example only with reference to attached drawings, in which.

DESCRIPTION OF EMBODIMENTS

Figure 5:
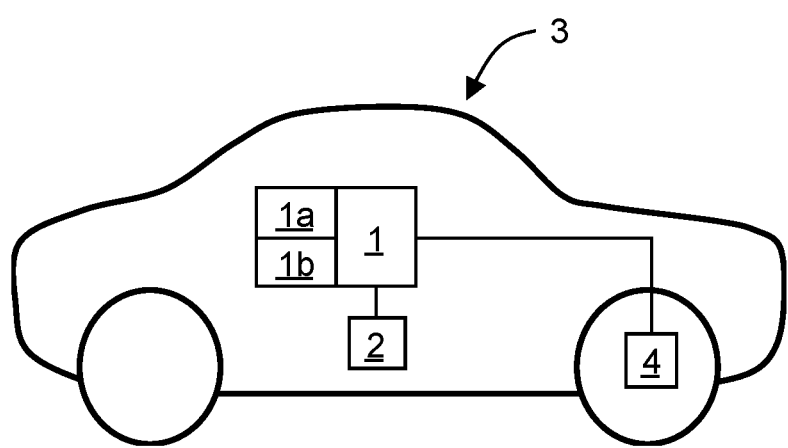
FIG. 5 illustrates schematically a road vehicle that comprises a steer torque manager having means adopted to execute the method according to the embodiments described herein.

In the following will be described, with reference to the attached drawings, some example embodiments of an improved method of providing a scenario-based overlay torque request signal in a steer torque manager 1 during driver-override of an auxiliary steering assistance system 2 function in a road vehicle 3, as illustrated in FIG. 5, and thus providing for a threat-based steering feel, during driver-override of an auxiliary steering assistance system 2 function, e.g. override of a lane centering ADAS or autonomous driving (AD) function, in a road vehicle 3.

A lane traveled by the road vehicle 3 will in the following be denominated by the reference numeral 5 and that lane 5 will usually be delimited by left- and right-hand lane markers 5a, 5b.

The road vehicle 3 is assumed to have an electrical power assisted steering system 4, and an auxiliary steering assistance system 2 function arranged to selectively apply a steering wheel overlay torque to a normal steering assistance torque in the electrical power assisted steering system 4 of the road vehicle 3.

The steer torque manager 1 of the road vehicle 3 is further assumed to have a driver-in-the-loop functionality 1a, for determining when and how to hand over control from the auxiliary steering assistance system 2 function to a driver of the road vehicle 3 and when a driver of the road vehicle 3 wishes to override the auxiliary steering assistance system 2 function without handing over control. This is done by the driver-in-the-loop functionality 1a through considering both a current steering wheel torque and a weighted average of a measured steering wheel torque over the last couple of seconds. As a result thereof the driver-in-the-loop functionality 1a will provide a driver-override related signal.

The steer torque manager 1 of the road vehicle 3 is also assumed to have a wheel angle controller 1b for providing, from an auxiliary steering assistance system 2 function wheel angle request, an overlay torque request to be added to a torque request from the electrical power assisted steering 4. Thus, the wheel angle controller 1b is arranged to provide an assistance torque request related signal from an auxiliary steering assistance system 2 function overlay torque request and a torque request from the electrical power assisted steering 4.

The method comprises receiving, from the wheel angle controller 1b the assistance torque request related signal and receiving, from the driver-in-the-loop functionality 1a, the driver-override related signal.

The method further comprises receiving, from road vehicle 3 on-board sensors, signals relating to road vehicle 3 velocity and steering pinion angle, a signal representative of a distance to an adjacent lane marker 5a, 5b and a signal representative of a distance to an adjacent potential threat object 6.

The road vehicle 3 is assumed to have a number of on-board sensors for providing some of the signals used in the described method, however such sensors does not form part of the present invention, only the ability to receive and utilize the signals emanating therefrom.

In accordance with the method, the steer torque manager 1 is, when the driver-override related signal indicates ongoing driver-override, configured to produce, from the received signals, a signal representative of a resistance torque request corresponding to one of a finite number of pre-defined scenarios for different signal combinations.

Finally, the method comprises producing, by the steer torque manager 1, the scenario-based steering wheel overlay torque request signal through combining the assistance torque request signal and the resistance torque request signal.

Thus, the scenario-based steering wheel overlay torque request signal is a combination of the assistance torque request signal, i.e. a signal for pulling in the same direction as a driver of the road vehicle 3, and the resistance torque request signal, i.e. a signal for pulling against the driver of the road vehicle 3.

The resistance torque requested will thus be a function of road vehicle 3 velocity, driver-in-the-loop impulse, steering pinion angle, distance to lane markers 5a, 5b, and distance to threat objects 6.

The term steering pinion angle is used as a rotation angle (steering angle) of a rotary shaft, which rotation angle can be converted into a steered angle of steered wheels of the road vehicle 3.

The driver-in-the-loop (DIL) impulse is, as described earlier, a measure of driver activity over a time window, i.e. a weighted steering wheel torque average over a time window, usually a time window of the most recent couple of seconds.

In a further embodiment the method comprises receiving as the signal representative of a distance to an adjacent potential threat object 6 a signal representative of an estimated Times to Collision (TTC) with that adjacent potential threat object 6, that is, an estimated period of time until the own vehicle 3 collides with that threat object 6, based on, for example, a distance between the own vehicle 3 and that threat object 6 and a relative velocity between the own vehicle 3 and that threat object 6.

In a yet further embodiment producing the signal representative of a resistance torque request in accordance with the method further comprises scaling the signal with the functions:

$f(x)_i$: $x \in [-1,1]$, $i \in \Omega$ $g(TTC)_i$: $TTC \in [0, TTC_{max}]$, $i \in \Omega$ where the set $\Omega$ contains a finite number of pre-defined scenarios for which a resistance torque previously has been separately tuned, and x is a normalized distance from an adjacent lane marker 5a, 5b to a center of a lane 5 currently traveled; a left-hand lane marker 5a being located at x=−1 and a right-hand lane marker 5b being located at x=1.

Some examples of resistance torque tuning for such pre-defined scenarios will be described later.

In a still further embodiment the method further comprises receiving a signal representative of classified potential threat objects 6 determined through fusion of sensor data from multiple vehicle 3 born sensors and systems, such as camera sensors, radar sensors, lidar sensors, satellite navigation systems and digital maps. For consistent and predictable behavior, the scenarios that form up the set $\Omega$ of scenarios should be easily identified by both a driver and the auxiliary steering assistance system 2, e.g. ADAS or AD system.

The method further comprises determining a current scenario from the set $\Omega$ of pre-defined scenarios based on the signal representative of classified potential threat objects 6.

Classified threat objects 6 are suitably provided by a classifier relying on fused sensor data, including fusion of road geometry data. The signal representative of classified potential threat objects 6 is used to determine a current scenario from the set $\Omega$ of scenarios based thereupon, and thus the shape of the functions $f(x)_i$ and $g(TTC)_i$.

An example of a classified threat object 6 may e.g. be a lorry or truck at the right-hand side of an ego road vehicle 3 in a road coordinate system. The classifier is suitably arranged to only present such a classified threat object 6 if it has been determined to exist with a predetermined high probability.

Thus, the scenarios that should be in the set $\Omega$ of scenarios needs to be defined and the desired resistance torque for each scenario specified, i.e. the shape of the functions $f(x)_i$ and $g(TTC)_i$.

In the following will be given some, non-exhaustive, examples how to tune the functions $f(x)_i$ and $g(TTC)_i$ for different scenarios.

For the examples illustrated in FIGS. 1 through 4 the top views illustrates the different traffic scenarios and the graphs there below the suggested example tunings of the resistance torque in dependence of a normalized distance from the left- and right-hand side lane markers 5a, 5b to a center of a lane 5 currently traveled.

Figure 1:
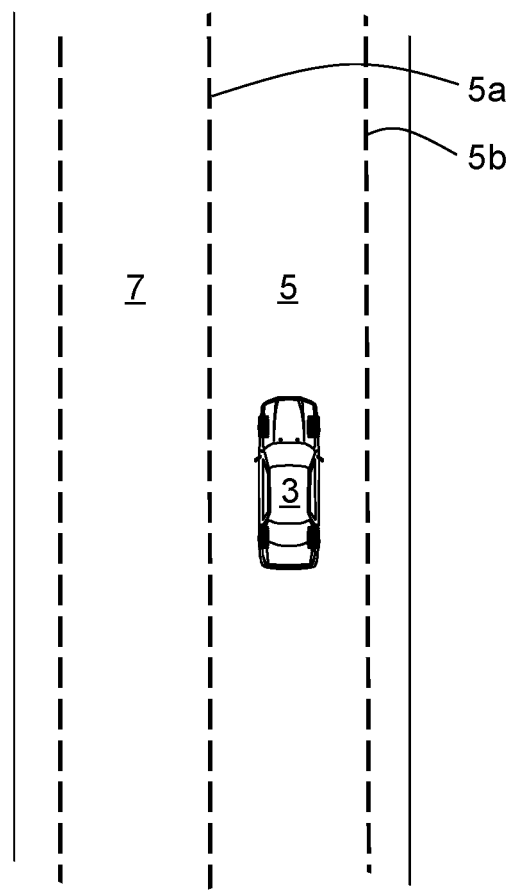
FIG. 1 illustrates schematically an example resistance torque tuning with respect to left- and right-hand lane markers without additional threat objects.
Figure 1:
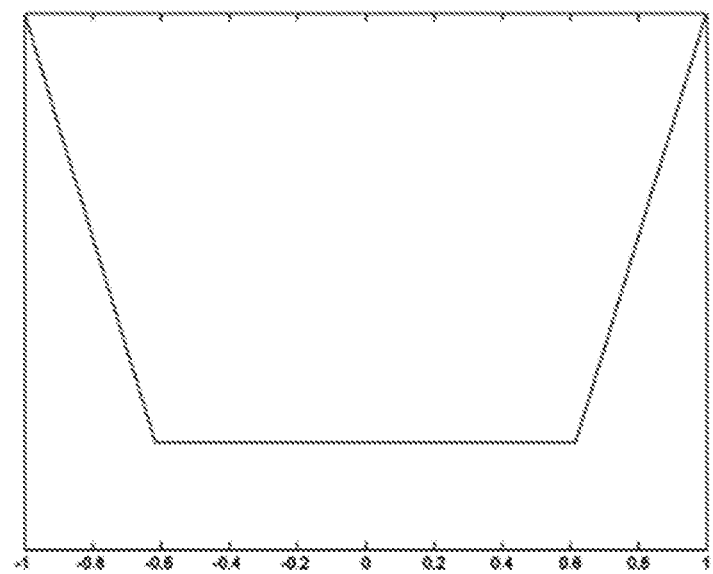

The resistance torque may be distributed in dependence of a position of the road vehicle 3 in a lane 5, e.g. bathtub shaped, or linearly increasing towards the lane markers 5a, 5b at the sides of the lane 5, as illustrated in FIG. 1, i.e. low resistance torque in the middle of the lane 5 and increasingly more resistance towards the outer boundaries of the lane 5, e.g. as indicated by the left- and right-hand lane markers 5a, 5b.

Higher resistance torque may e.g. be provided if the road vehicle 3 moves towards a solid lane marker 5a, 5b line than a dashed lane marker 5a, 5b line. Higher resistance torque may e.g. be provided if the road vehicle 3 moves towards concrete barriers and the resistance torque may be increased earlier as compared to when no concrete barriers are present.

Additionally, the shape of the functions $f(x)_i$ and $g(TTC)_i$ may also be dependent on lane 5 width as well as on curve radius.

The functions $f(x)_i$ and $g(TTC)_i$ may be tuned to provide less resistance torque at road works, making it easier to overrule the auxiliary steering assistance system 2 function for safely traversing a road work area.

The functions $f(x)_i$ and $g(TTC)_i$ may be tuned to provide less resistance torque when e.g. an emergency vehicle is determined to be approaching, making it easier to overrule the auxiliary steering assistance system 2 function and provide for an unobstructed passing by the emergency vehicle.

The functions $f(x)_i$ and $g(TTC)_i$ may be tuned to be velocity dependent, such that they are less aggressive in low-velocity situations, e.g. traffic jam situations, making it easier to negotiate a traffic jam.

Figure 2:
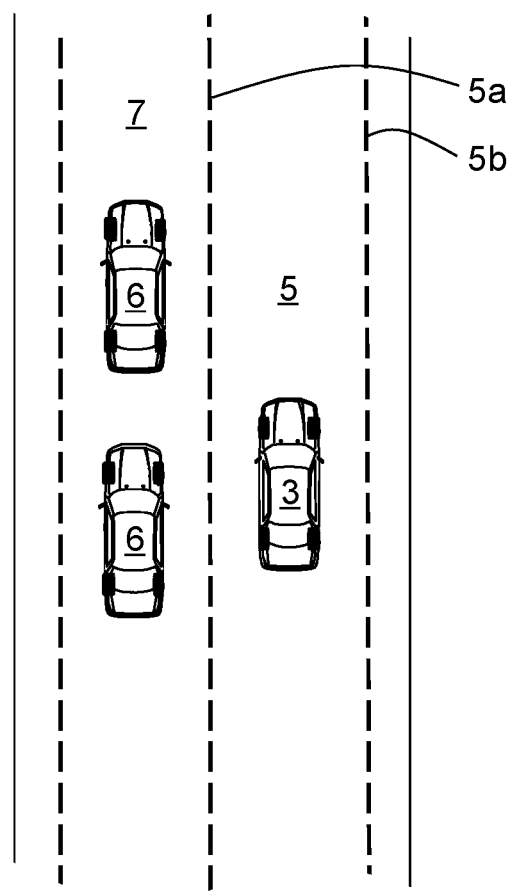
FIG. 2 illustrates schematically an example resistance torque tuning with respect to threat objects to the left of the ego road vehicle.
Figure 2:
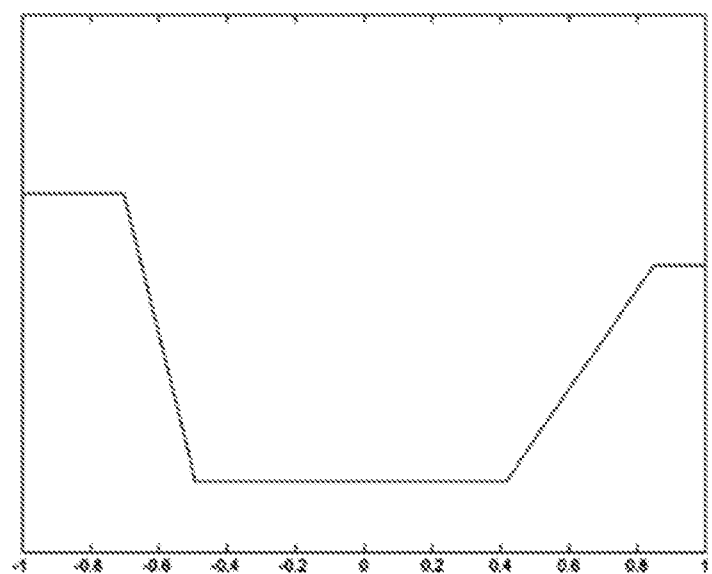

The functions $f(x)_i$ and $g(TTC)_i$ may also be tuned to provide more resistance torque should the ego road vehicle 3 be steered towards a vehicle 6 driving in an adjacent lane 7, e.g. as illustrated in FIG. 2.

The functions $f(x)_i$ and $g(TTC)_i$ may further be tuned to provide resistance torque in dependence of what is present next to or adjacent a lane marker 5a, 5b line, e.g. a barrier beneath the lane marker, the width of a hard shoulder outside the lane marker 5a, 5b, etc.

The functions $f(x)_i$ and $g(TTC)_i$ may additionally be tuned to be situation based, e.g. to handle a "multiple threat" situation, such as an offset situation where less resistance torque may be preferred towards a (solid) barrier while overtaking a truck, because the truck might move towards the ego road vehicle 3 while the barrier will not move.

The functions $f(x)_i$ and $g(TTC)_i$ may also be tuned to take "freespace" into account, e.g. such that less resistance torque is provided for moving the ego road vehicle 3 in a direction of a determined "freespace".

The functions $f(x)_i$ and $g(TTC)_i$ may in some cases be tuned to provide for different behavior based on map data, e.g. to provide for different resistance torque if the ego road vehicle 3 is close to a city center, is entering an urban area, or is traveling on a highway.

The functions $f(x)_i$ and $g(TTC)_i$ may also be tuned to take small road situations into account, e.g. by making it easier to cross a lane marker 5a, 5b with oncoming traffic or to overtake cyclists or pedestrians on the same site when traveling on smaller two-way traffic roads.

The functions $f(x)_i$ and $g(TTC)_i$ may furthermore be tuned to allow a driver to anticipate on a corner, e.g. to provide for a reduced resistance torque allowing for corner/curve cutting.

The functions $f(x)_i$ and $g(TTC)_i$ may still further be tuned to take into account fast vehicles approaching from behind, e.g. such as on the German Autobahn, and to provide for an increased distance to and a higher resistance torque towards an adjacent lane 7 wherein such a fast vehicle is approaching.

The functions $f(x)_i$ and $g(TTC)_i$ may additionally be tuned to consider the risk of kids or animals crossing the road, e.g. daytime dependent to provide for an increased distance to and a higher resistance torque for moving the ego vehicle 3 towards the side of the road when passing a school or playground.

The functions $f(x)_i$ and $g(TTC)_i$ may also be tuned to provide different resistance behavior depending on lighting or weather conditions, e.g. different behavior at night time, such as to provide for an increased distance to and a higher resistance torque for moving the ego vehicle 3 towards the side of the road.

The functions $f(x)_i$ and $g(TTC)_i$ may yet further be tuned to be driver state based, e.g. based on if a driver is in or out of the loop, such as by using a human machine interface (HMI), using a phone, or similarly distracted or preoccupied. This may e.g. be done through providing for a higher resistance torque for moving the ego vehicle 3 towards the side of the road when a driver is determined to be distracted or preoccupied.

The functions $f(x)_i$ and $g(TTC)_i$ may also be tuned to provide different resistance torque behavior during a driver overtake request from the auxiliary steering assistance system 2 function, e.g. to raise resistance torque or provide a higher maximum torque when a driver is not answering to the takeover request.

Thus, for a determined current scenario with no threat objects 6 to the right or to the left of the ego road vehicle 3, a function $f(x)$ may be used that is a convex bathtub shaped function with a flat minimum at x=0 and monotonically increasing with increasing |x| as the road vehicle 3 approaches a lane marker 5a, 5b, i.e. as the distance between the ego road vehicle 3 and either side lane marker 5a, 5b decreases.

Figure 3:
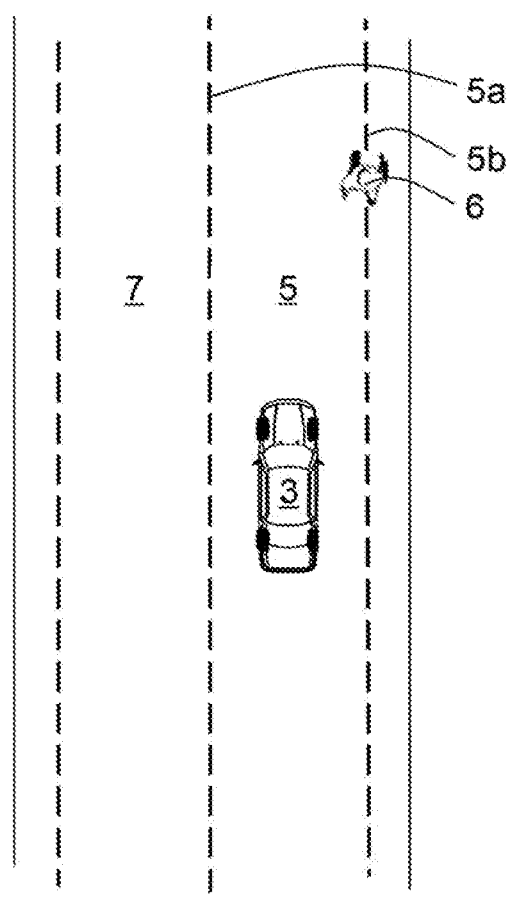
FIG. 3 illustrates schematically an example resistance torque tuning with respect to a threat object to the right of the ego road vehicle.
Figure 3:
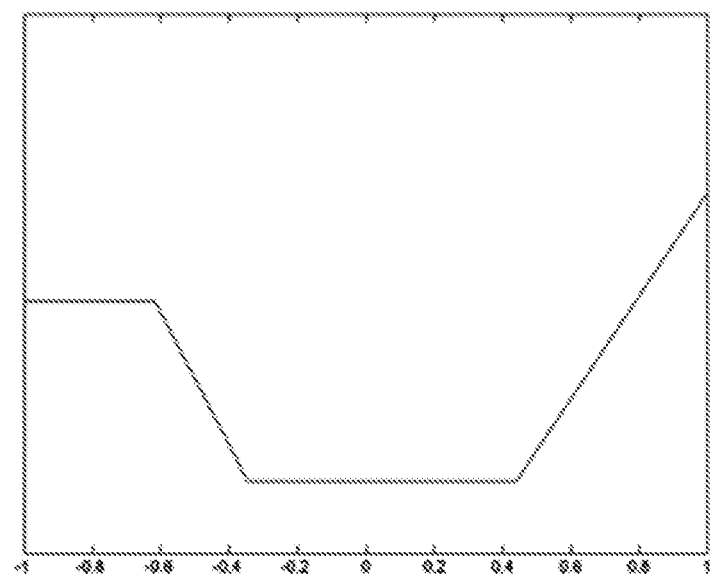

For a determined current scenario with threat objects 6 either to the left or to the right of the lane 5 currently traveled a function $f(x)$ may be used that is asymmetric around the center x=0 of the lane 5 currently traveled, e.g. as illustrated in FIG. 2, where there are vehicles 6 in the adjacent lane 7 to the left of the ego road vehicle 3, or as illustrated in FIG. 3, where there is a pedestrian 6 at the right-hand side of the lane 5 traveled by the ego road vehicle 3.

Figure 4:
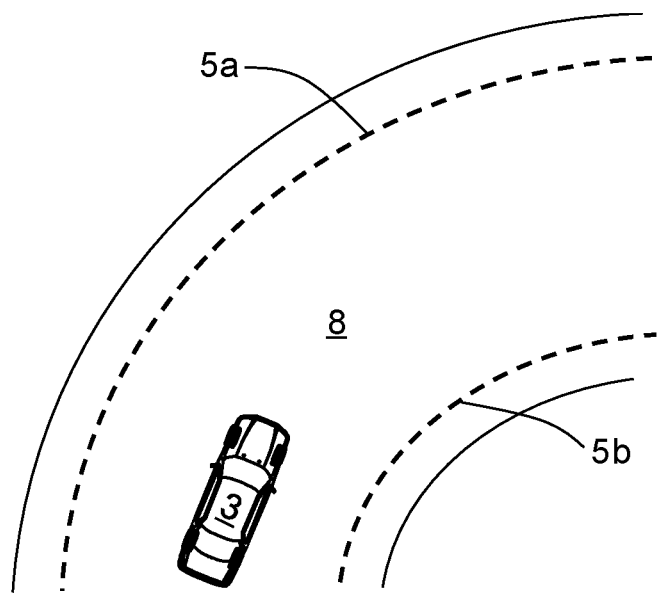
FIG. 4 illustrates schematically an example resistance torque tuning with respect to a curve entry.
Figure 4:
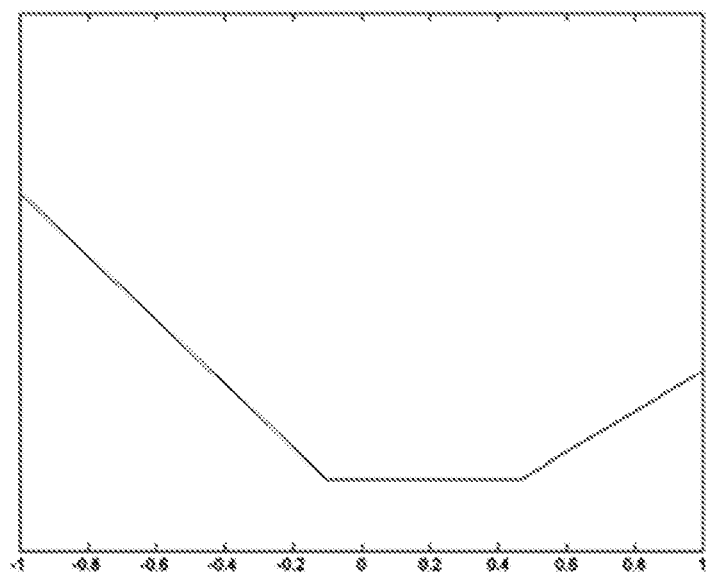

The functions $f(x)_i$ and $g(TTC)_i$ may be tuned to provide different resistance torque behavior in a curve 8 entry or exit situation, e.g. as illustrated in FIG. 4, where the ego road vehicle 3 is entering a curve 8 to the right and more resistance torque is provided against any attempts to move the ego vehicle 3 towards the outside of the curve 8.

The function $g(TTC)_i$ may further be arranged to increase the resistance torque in case that a driver of the road vehicle 3 is pulling against the auxiliary steering assistance system 2 function, such as a lane centering function, towards a collision with a threat object 6, such that $g(TTC)_i$ increases with decreasing Time to Collision TTC with that threat object 6, and if $TTC>TTC_{max}$ then $g(TTC)_i=1$.

Furthermore, here envisaged is a road vehicle steer torque manager 1 having means adopted to execute the above method.

Such a road vehicle 3 steer torque manager 1 has a wheel angle controller 1b for providing an assistance torque request related signal from an auxiliary steering assistance system 2 function overlay torque request and a torque request from the electrical power assisted steering 4. It further has a driver-in-the-loop functionality 1a, for determining driver-override of the auxiliary steering assistance system 2 function. Override is determined through considering both a current steering wheel torque and a weighted average of a measured steering wheel torque, DIL-impulse, over the last couple of seconds. From that determination it is arranged to provide a driver-override related signal. The road vehicle 3 steer torque manager 1 furthermore has means adopted to execute the above method.

The means adapted to execute the above method may e.g. comprise: a memory for storing a program and a finite number of pre-defined scenarios; a processor or central processing unit (CPU) for executing the program written in the memory; a first signal interface for receiving from the road vehicle 3 on-board sensors the signals used in the herein described method and converting these signals into forms suitable for processing by the processor; and a second signal interface for outputting the scenario-based steering wheel overlay torque request signal produced.

Still further here envisaged is a computer program comprising instructions to cause the above road vehicle 3 steer torque manager 1 to execute the above method as described above.

The above described embodiments of the method, road vehicle steer torque manager 1, and computer program have the beneficial effects of facilitating the provision of a scenario-based resistance torque, and thus a threat-based steering feel, during driver-override of an auxiliary steering assistance system 2 function, such as an ADAS function, in a road vehicle 3.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

The invention claimed is:

1. A method of providing a scenario-based overlay torque request signal in a steer torque manager (1) during driver-override of an auxiliary steering assistance system (2) function in a road vehicle (3) having an electrical power assisted steering system (4), the steer torque manager (1) including a wheel angle controller (1b) that provides an assistance torque request related signal from an auxiliary steering assistance system (2) function overlay torque request and a torque request from the electrical power assisted steering (4); and a driver-in-the-loop functionality (1a) that determines driver-override of the auxiliary steering assistance system (2) function through considering both a current steering wheel torque and a weighted average of a measured steering wheel torque over the last couple of seconds and providing a driver-override related signal, the method comprising:
receiving the assistance torque request related signal;
receiving the driver-override related signal;
receiving a road vehicle velocity related signal;
receiving a steering pinion angle related signal;
receiving a signal representative of a distance to an adjacent lane marker;
receiving a signal representative of a distance to an adjacent potential threat object;
producing from the received signals, when the driver-override related signal indicates ongoing driver-override, a signal representative of a resistance torque request corresponding to one of a finite number of pre-defined scenarios for which a resistance torque previously has been separately tuned for different signal combinations; and
producing, by the steer torque manager (1), a scenario-based steering wheel overlay torque request signal through combining the assistance torque request signal and the resistance torque request signal.

2. A method according to claim 1, wherein it further comprises receiving as the signal representative of a distance to an adjacent potential threat object (6) a signal representative of an estimated Times to Collision (TTC) with an adjacent potential threat object (6).

3. A method according claim 2, wherein producing the signal representative of a resistance torque request further comprises scaling the signal with the functions:

$f(x)_i$: $x \in [-1,1]$, $i \in \Omega$
$g(TTC)_i$: $TTC \in [0, TTC_{max}]$, $i \in \Omega$ where the set $\Omega$ contains a finite number of pre-defined scenarios for which a resistance torque previously has been separately tuned, and x is a normalized distance from an adjacent lane marker (5a, 5b) to a center of a lane (5) currently travelled; a left-hand lane marker (5a) being located at x=−1 a right-hand lane marker (5b) being located at x=1.

4. A method according to claim 3, wherein it further comprises receiving a signal representative of classified potential threat objects (6) determined through fusion of sensor data from multiple vehicle (3) born sensors and systems and determining a current scenario from the set $\Omega$ of pre-defined scenarios based on the signal representative of classified potential threat objects (6).

5. A method according to claim 3, wherein it further comprises using, for a determined pre-defined scenario with no potential threat objects (6) to the right or to the left of the road vehicle (3), a function $f(x)$ being a convex bathtub shaped function with a flat minimum at x=0 and monotonically increasing with increasing |x| as the road vehicle (3) approaches a lane marker (5a,5b).

6. A method according to claim 3, wherein it further comprises using, for a determined scenario with threat objects (6) either to the left or to the right of a lane (5) currently travelled by the road vehicle (3), a function $f(x)$ being asymmetric around the center x=0 of the lane (5) currently travelled and increasing as the road vehicle (3) approaches threat objects (6).

7. A method according to claim 3, wherein it further comprises using, in case that a driver of the road vehicle (3) is pulling against the auxiliary steering assistance system (2) function towards a collision with a potential threat object (6), a function $g(TTC)_i$ arranged to increase the resistance torque, the function $g(TTC)_i$ being increasing with decreasing Time to Collision (TTC).

8. A road vehicle (3) steer torque manager (1) comprising:
a wheel angle controller (1b) that provides an assistance torque request related signal from an auxiliary steering assistance system (2) function overlay torque request and a torque request from the electrical power assisted steering (4);
a driver-in-the-loop functionality (1a) that determines driver-override of the auxiliary steering assistance system (4) function through considering both a current steering wheel torque and a weighted average of a measured steering wheel torque over the last couple of seconds and providing a driver-override related signal;
a memory for storing a program and a finite number of pre-defined scenarios;
a processor for executing the program stored in the memory;
a first signal interface for receiving signals from sensors on-board the road vehicle and converting these signals into forms suitable for processing by the processor; and
a second signal interface for outputting the scenario-based steering wheel overlay torque request signal produced adopted to execute the method of claim 1.

9. A computer program embodied on a non-transitory computer-readable storage medium, the computer program comprising instructions when executed by a processing circuit are configured to cause a road vehicle (3) steer torque manager (1) to execute the method of claim 1,
said road vehicle steer torque manager including:
a wheel angle controller (1b) that provides an assistance torque request related signal from an auxiliary steering assistance system (2) function overlay torque request and a torque request from the electrical power assisted steering (4); and
a driver-in-the-loop functionality (1a) that determines driver-override of the auxiliary steering assistance system (4) function through considering both a current steering wheel torque and a weighted average of a measured steering wheel torque over the last couple of seconds and providing a driver-override related signal.

* * * * *